United States Patent [19]

Gilligan, III

[11] Patent Number: 4,548,720
[45] Date of Patent: Oct. 22, 1985

[54] REMOVAL OF HYDROGEN SULFIDE FROM DRILLING FLUIDS

[75] Inventor: Thomas J. Gilligan, III, Painesville, Ohio

[73] Assignee: Diamond Shamrock Chemicals Company, Dallas, Tex.

[21] Appl. No.: 487,196

[22] Filed: Apr. 21, 1983

[51] Int. Cl.$^4$ .............................................. C09K 7/04
[52] U.S. Cl. ................. 252/8.5 B; 166/902; 252/8.55 E; 252/387
[58] Field of Search ........... 252/8.5 B, 8.55 R, 8.5 R, 252/8.55 E, 8.5 A, 387; 260/98, 686; 166/274, 275, 265, 266, 244 C; 423/224

[56] References Cited

U.S. PATENT DOCUMENTS

| | | | |
|---|---|---|---|
| 3,506,572 | 4/1970 | Van Dyke et al. | 252/8.5 B |
| 3,928,211 | 12/1975 | Browning et al. | 252/8.5 B |
| 4,008,775 | 2/1977 | Fox | 175/64 |
| 4,059,533 | 11/1977 | Watson et al. | 252/8.5 B |
| 4,086,962 | 5/1978 | Cha | 166/266 |
| 4,121,663 | 10/1978 | Compton | 166/265 |
| 4,143,119 | 3/1979 | Asperger et al. | 252/390 |
| 4,147,212 | 4/1979 | Tisdale | 252/8.5 B |
| 4,246,243 | 1/1981 | Fox | 252/8.5 B |
| 4,324,298 | 4/1982 | Fox | 175/64 |
| 4,374,104 | 2/1983 | Primack | 423/226 |
| 4,382,912 | 5/1983 | Madgavkar et al. | 166/266 |
| 4,440,650 | 4/1984 | Watson et al. | 166/266 |
| 4,473,115 | 9/1984 | Oakes | 252/8.55 E |

FOREIGN PATENT DOCUMENTS 0744571  10/1966  Canada ................................. 166/265

OTHER PUBLICATIONS

Chilingarian, et al., 1983, Drilling and Drilling Fluids: Updated textbook edition, Elsivier Science Publishing Company, Inc., New York, pp. 573-575.
Technology, Apr. 20, 1981, Oil and Gas Journal, p. 63.

*Primary Examiner*—Stephen J. Lechert, Jr.
*Assistant Examiner*—Howard J. Locker
*Attorney, Agent, or Firm*—Thoburn T. Dunlap

[57] ABSTRACT

The present invention relates to a process for scavenging hydrogen sulfide which frequently becomes entrained in drilling fluid during the course of drilling operations through subterranean formations. The process consists of introducing a solid oxidant in powdered form into the circulating drilling fluid when hydrogen sulfide is encountered. The solid oxidants are selected from the group consisting of calcium hypochlorite (Ca(OCl)$_2$), sodium perborate (NaBO$_3$), potassium permanganate (KMnO$_4$), and potassium peroxydisulfate (K$_2$S$_2$O$_8$). The solid oxidants are soluble in the drilling fluid, promoting fast and complete scavenging reactions without adversely altering the drilling fluid rheology.

7 Claims, No Drawings

REMOVAL OF HYDROGEN SULFIDE FROM DRILLING FLUIDS

FIELD OF THE INVENTION

This invention relates to hydrogen sulfide scavengers in drilling fluids. More specifically, this invention relates to solid oxidants utilized in drilling fluids to eliminate hydrogen sulfide therefrom.

BACKGROUND OF THE INVENTION

Encounters with hydrogen sulfide occur frequently during drilling operations for oil and gas. Occasionally, during the course of drilling through subterranean formations, a drill will puncture a strata with high hydrogen sulfide gas content. Such encounters are known in the industry as sour gas kicks. As the drilling fluid is circulated through the drill string and drill bit penetrating such subterranean formations to the bottom of the borehole and then back to the surface via the annular space between the drill pipe and bore wall, the drilling fluid will entrain high levels of hydrogen sulfide which subsequently are released at the surface. Hydrogen sulfide emerging from such kicks present severe hazards to both drilling personnel and equipment.

Prolonged exposure of drilling personnel to low concentrations of hydrogen sulfide can be lethal, and exposure to higher concentrations can be fatal within minutes. Exposure of drilling equipment to hydrogen sulfide can cause equipment failure due to sulfide stress cracking and hydrogen embrittlement of steel. Small concentrations of hydrogen sulfide as low as 0.1 ppm can greatly reduce equipment life. Hydrogen sulfide can react with metallic and dissolved iron to form insoluble iron sulfides subsequently causing well and equipment fouling problems. Hydrogen sulfide can alter drilling fluid pH consequently causing dramatic changes in drilling fluid viscosity. Hydrogen sulfide is also an environmental pollutant giving off a nauseating "rotten egg" odor. Hydrogen sulfide is not only toxic and corrosive but is highly flammable.

Zinc carbonate has been widely used in the industry to scavenge hydrogen sulfide in drilling fluids. However, zinc compounds react with sulfide ions via an acid-base ionic reaction; and for the reaction to proceed, the hydrogen sulfide must be continually neutralized by alkaline zinc carbonate. Therefore, at a low pH, zinc carbonate would not provide adequate scavenging protection. In addition, zinc compounds are relatively expensive and if used in excess may cause drilling fluid rheology problems.

Iron oxides have been effectively employed to scavenge hydrogen sulfide as disclosed in U.S. Pat. Nos. 4,008,775 and 4,324,398. However, iron oxides are difficult to disperse and impart additional weighting properties that increase the density of the drilling fluid. Additionally, iron oxides are dependent upon a low pH to effectively scavenge hydrogen sulfide.

Because the foregoing hydrogen sulfide scavengers are insoluble, they may need additional dispersing agents as disclosed in U.S. Pat. No. 3,928,211. Moreover, such insoluble scavengers would be relatively slow acting, i.e., needing to be fully dispersed before complete reactions could proceed. It would, therefore, be desirable to provide a hydrogen sulfide scavenger that is easily dispersed, fast acting and which provides excellent scavenging power without adversely altering the drilling fluid rheology.

SUMMARY OF THE INVENTION

In accordance with the present invention, it has been discovered that several solid oxidants can be effectively employed to scavenge hydrogen sulfide entrained in drilling fluids thereby eliminating hazards to drilling personnel and reducing hydrogen sulfide corrosion to drilling equipment while not adversely altering the drilling fluid rheology. The solid oxidants of the present invention are soluble in the drilling fluid, alleviating the need for dispersing agents and promoting fast, irreversible and complete scavenging reactions. In addition, the solid oxidants of the present invention function as bactericides.

DESCRIPTION OF THE PREFERRED EMBODIMENTS

The present invention provides several solid oxidants that are effective as scavengers for hydrogen sulfide that becomes entrained in drilling fluids during the course of penetrating hydrogen sulfide zones when drilling for oil and gas. For purposes herein, the terms scavenging and scavenge and the like refer to the addition of solid oxidant compounds to hydrogen sulfide contaminated drilling fluid to convert the hydrogen sulfide to free sulfur and innocuous sulfer by-products. It has been found that potassium permanganate ($KMnO_4$), sodium perborate ($NaBO_3$), potassium peroxydisulfate ($K_2S_2O_8$), and calcium hypochlorite ($Ca(OCl)_2$) are extremely effective scavengers of hydrogen sulfide ($H_2S$).

The solid oxidants of the present invention should be soluble in the drilling fluid. The oxidants are added as a solid, but will quickly dissolve in the drilling fluid enabling the scavenging reactions to take place in the aqueous phase. Because the solid oxidants are soluble, they readily disperse throughout the drilling fluid, providing fast and complete scavenging reactions. In addition, the use of dispersants for the purpose of evenly dispersing the scavenger throughout the drilling fluid is alleviated.

It will be readily recognized by one skilled in the art that by reducing the particle size of the oxidant crystals, solubility can be greatly enhanced. The smaller particle size of the present invention may be obtained by powdering the oxidant crystals. The method of powdering the oxidant crystals is not critical, only in that the requisite particle size is obtained (i.e., a small particle size).

The preferred mode of utilization would be to introduce any of the solid oxidants of the present invention directly into the drilling fluid once a hydrogen sulfide kick has been encountered. The oxidants of the present invention may also be introduced into the drilling fluid as part of the initial drilling fluid formulation. For example, when drilling through known hydrogen sulfide bearing strata, pretreating the drilling fluid with the oxidants of the present invention would be desirable. Generally for economy, however, the fast acting oxidants of the present invention alleviate the need to include them as part of the initial drilling fluid formulation.

The solid oxidants utilized in the present invention should be added to the drilling fluid in slight excess over the quantity of hydrogen sulfide present or anticipated in the drilling fluid. The amount of hydrogen sulfide may be readily determined by evaluation techniques well known to the industry. Under adverse conditions, for example, where highly concentrated strata of hydrogen sulfide is encountered, increased levels of solid oxidant may be necessary. Such higher levels of solid oxidant may be safely employed without adversely affecting the drilling fluid rheology. For example, in utilizing the preferred embodiment of the present invention, up to about 20 pounds of powdered $Ca(OCl)_2$ are added per barrel of drilling fluid depending on the amount of hydrogen sulfide present. The above range is not critical and more oxidant may be added as needed.

As stated hereinabove, the oxidants are added as a solid and dissolve in the drilling fluid enabling the scavenging reactions to proceed in the aqueous phase. The reaction product is mainly elemental sulfur with minor amounts of sulfate being formed. In the preferred embodiment, $Ca(OCl)_2$ reacts to give elemental sulfur with calcium chloride ($CaCl_2$) as a by-product. The reaction products are stable in that there is no danger of reversion back to hydrogen sulfide. In addition, the inert reaction products need not be removed from the drilling fluid.

The oxidants of the present invention also function as bactericides. As drilling fluid is circulated through strata bearing sulfide producing bacteria, the bacteria become entrained in the drilling fluid subsequently contaminating the drilling fluid settling pits, storage tanks and pipe network. The sulfide producing bacteria continue to grow and flourish in this environment producing deleterious amounts of hydrogen sulfide. Scavenging the sulfide without destroying the bacteria does not eliminate the sulfide problem since the sulfide is regenerated by the bacteria. The oxidants of the present invention not only eliminates the hydrogen sulfide but also destroys the hydrogen sulfide producing bacteria as well.

The following examples will further serve to illustrate and disclose the operation and advantages of the present invention. These examples should not be considered, however, as a limitation upon the scope of the invention.

EXAMPLE 1

This example demonstrates the effectiveness of several solid oxidants in reducing sulfide ion concentrations in drilling fluids.

Each solid oxidant was added in increments to sulfide contaminated drilling fluid test samples. The test samples were prepared by combining 50 ml of $10^{-2}$M aqueous sodium sulfide with 50 ml of drilling fluid. The initial sulfide concentration in the drilling fluid was $10^{-3}$ mols. The drilling fluid contained the following components:

| | |
|---|---|
| $H_2O$ | 86.30% |
| NaCl | 0.22% |
| $CaCO_3$ | 0.44% |
| Dixie Bond Clay* | 3.50% |
| IMCO Gel** (bentonite) | 4.30% |
| IMCO Clay** | 5.24% |

*A product of International Minerals & Chemical Corp.
**Products of IMCO Services The ratio (EOS) of oxidant equivalents to equivalents of sulfide initially in the test sample was raised to 0.5/1.0, 1.0/1.0, 2.0/1.0 and 4.0/1.0 respectively. The pH of the test samples was adjusted to and maintained at 8.0. At each EOS, the potential of the test sample was recorded using an Orion TM 94-16 sulfide ion selective electrode and compared to a calibration curve to determine the sulfide levels remaining in the sample. A calomel electrode was used as a reference electrode. As shown in Table I below, adding the solid oxidants to the contaminated drilling fluid reduces the sulfide content.

TABLE I

| Oxidant | EOS Ratio of Oxidant Eq./Sulfide Eq. | Total Wt. of Oxidant in Sample (g) | Sulfide Conc. (Molarity) |
|---|---|---|---|
| $Ca(OCl)_2$ | 0.0/1.0 | 0.0000 | $5 \times 10^{-3}$ |
| | 0.6/1.0 | 0.0229 | $8 \times 10^{-5}$ |
| | 1.3/1.0 | 0.0458 | $4 \times 10^{-5}$ |
| | 2.6/1.0 | 0.0915 | $8 \times 10^{-6}$ |
| | 5.1/1.0 | 0.1831 | Essentially Zero |
| $KMnO_4$ | 0.0/1.0 | 0.0000 | $5 \times 10^{-3}$ |
| | 0.5/1.0 | 0.0264 | $7 \times 10^{-5}$ |
| | 1.0/1.0 | 0.0527 | less than $10^{-7}$ |
| | 2.0/1.0 | 0.1054 | Essentially Zero |
| | 4.0/1.0 | 0.2107 | Essentially Zero |
| $NaBO_3 \cdot 4H_2O$ | 0.0/1.0 | 0.0000 | $5 \times 10^{-3}$ |
| | 0.5/1.0 | 0.0385 | $8 \times 10^{-5}$ |
| | 1.0/1.0 | 0.0769 | $8 \times 10^{-7}$ |
| | 2.0/1.0 | 0.1538 | $6 \times 10^{-7}$ |
| | 4.0/1.0 | 0.3076 | Indeterminate |
| $K_2S_2O_8$ | 0.0/1.0 | 0.0000 | $5 \times 10^{-3}$ |
| | 0.5/1.0 | 0.0676 | $1 \times 10^{-4}$ |
| | 1.0/1.0 | 0.1352 | $4 \times 10^{-5}$ |
| | 2.0/1.0 | 0.2703 | $9 \times 10^{-5}$ |
| | 4.0/1.0 | 0.5047 | Indeterminate |

EXAMPLE 2

This example further demonstrates the effectiveness of powdered $Ca(OCl)_2$ in reducing sulfide levels in drilling fluid.

A drilling fluid sample of the same composition as illustrated in Example 1 was used in this example. The sulfide levels in the drilling fluid were monitored with an Orion TM sulfide specific electrode in conjunction with a calomel reference electrode. The drilling fluid initially gave a baseline potential value of +98 mV in the absence of sulfide ion. Sodium sulfide was then added to the drilling fluid dropping the potential to −740 mV, indicating a high sulfide concentration. Powdered calcium hypochlorite was then added in increments causing subsequent increases in potential, indicating sulfide consumption (Table II).

TABLE II

| Component | Weight | Potential Reading |
|---|---|---|
| Drilling Fluid/$H_2O$ | 49.2 g/10.2 g | + 98 mV |
| Add 0.1 M $Na_2S$ | 7.6 g | −740 mV |
| Add $Ca(OCl)_2$ | 0.22 g | −692 mV |
| Add $Ca(OCl)_2$ | 0.53 g | + 96 mV |

What is claimed is:

1. In the process of drilling a well wherein a drilling fluid is circulated through a drill string and bit penetrating subterranean formations and back to the surface, the improvement which comprises adding to said drilling fluid a sufficient amount of $Ca(OCl)_2$ solid oxidant to scavenge hydrogen sulfide encountered in said subterranean formations without adversely altering the rheological properties of said drilling fluid.

2. The process of claim 1 wherein the solid oxidant is in powdered form.

3. The process of claim 1 wherein the solid oxidant is soluble in the drilling fluid.

4. The process of claim 1 wherein the solid oxidant is added to said drilling fluid in an amount up to 20 pounds per barrel of drilling fluid.

5. The process of claim 1 wherein the hydrogen sulfide is irreversibly converted to sulfur and/or sulfate.

6. A method of eliminating $H_2S$ from drilling fluids which comprises adding a sufficient amount of powdered $Ca(OCl)_2$ to said drilling fluid to scavenge said hydrogen sulfide contamination without adversely altering the rheological properties of said drilling fluid.

7. A drilling fluid composition which comprises $Ca(OCl)_2$ in an amount sufficient to scavenge hydrogen sulfide when encountered in subterranean formations without adversely altering the rheological properties of said drilling fluid.

* * * * *